US009638432B2

(12) United States Patent
Sinur et al.

(10) Patent No.: US 9,638,432 B2
(45) Date of Patent: May 2, 2017

(54) VENTILATION UNIT CALIBRATION APPARATUS, SYSTEM AND METHOD

(75) Inventors: Richard R. Sinur, Grafton, WI (US); Steven A. Johnson, Hartland, WI (US); Brian R. Wellnitz, Grafton, WI (US); Mirko Zakula, New Berlin, WI (US)

(73) Assignee: Broan-NuTone LLC, Hartford, WI (US)

( * ) Notice: Subject to any disclaimer, the term of this patent is extended or adjusted under 35 U.S.C. 154(b) by 889 days.

(21) Appl. No.: 12/873,069

(22) Filed: Aug. 31, 2010

(65) Prior Publication Data

US 2012/0052792 A1   Mar. 1, 2012

(51) Int. Cl.
| | |
|---|---|
| F24F 7/06 | (2006.01) |
| F24F 7/007 | (2006.01) |
| F24F 13/08 | (2006.01) |
| F24F 11/00 | (2006.01) |
| F24C 15/20 | (2006.01) |
| F04D 27/00 | (2006.01) |
| H02P 6/16 | (2016.01) |
| F24F 11/04 | (2006.01) |

(52) U.S. Cl.
CPC ........ F24F 11/0009 (2013.01); F04D 27/001 (2013.01); F24C 15/2021 (2013.01); F24F 7/065 (2013.01); F24F 11/0079 (2013.01); F24F 11/04 (2013.01); F24F 2011/0042 (2013.01); H02P 6/16 (2013.01); Y02B 30/746 (2013.01); Y10T 29/49826 (2015.01); Y10T 137/0324 (2015.04)

(58) Field of Classification Search
CPC .................................. F24F 7/025; F24F 7/08

USPC .......................................... 454/61, 341, 343
See application file for complete search history.

(56) References Cited

U.S. PATENT DOCUMENTS

| | | | |
|---|---|---|---|
| 3,075,335 A | | 1/1963 | Bandlow |
| 3,487,767 A | * | 1/1970 | Kristiansen ................... 454/235 |
| 3,625,135 A | | 12/1971 | Carlson |
| 4,050,291 A | | 9/1977 | Nelson |
| 4,546,293 A | | 10/1985 | Peterson et al. |
| 4,552,059 A | | 11/1985 | Potter |
| 5,139,009 A | * | 8/1992 | Walsh ....................... 126/299 R |

(Continued)

FOREIGN PATENT DOCUMENTS

| | | |
|---|---|---|
| EP | 0681150 A2 | 11/1995 |
| EP | 2612079 A2 | 7/2013 |

(Continued)

OTHER PUBLICATIONS

Brushless DC electric motor, Webpage, Feb. 27, 2010, pp. 1-6, Wikipedia.

(Continued)

Primary Examiner — Steven B McAllister
Assistant Examiner — Jonathan Cotov
(74) Attorney, Agent, or Firm — Schwegman Lundberg & Woessner, P.A.

(57) ABSTRACT

A ventilation unit for installation in a ventilation system. The ventilation unit can include a motor coupled to a fan element and a power source. The ventilation unit can also include a calibration module having one of a voltage and current regulator for adjusting the performance of the ventilation unit based on at least one characteristic of the ventilation system.

16 Claims, 12 Drawing Sheets

(56) References Cited

U.S. PATENT DOCUMENTS

| | | | | |
|---|---|---|---|---|
| 5,269,660 | A | * | 12/1993 | Pradelle ............... E21F 1/00 417/18 |
| 5,385,505 | A | | 1/1995 | Sharp et al. |
| 5,394,663 | A | | 3/1995 | Jackson |
| 5,447,414 | A | * | 9/1995 | Nordby et al. ............. 417/20 |
| 5,559,407 | A | | 9/1996 | Dudley et al. |
| 5,676,523 | A | | 10/1997 | Lee |
| 6,170,480 | B1 | * | 1/2001 | Melink et al. ........... 126/299 R |
| 6,237,592 | B1 | | 5/2001 | Surjadi et al. |
| 6,353,299 | B1 | | 3/2002 | Ramachandran et al. |
| 6,710,504 | B2 | | 3/2004 | Ohiwa et al. |
| 7,048,199 | B2 | * | 5/2006 | Melink ................... 236/49.3 |
| 7,455,583 | B2 | * | 11/2008 | Taya ....................... 454/256 |
| 8,669,730 | B2 | | 3/2014 | Nakajima |
| 2004/0101412 | A1 | * | 5/2004 | Kallman ............ F04D 27/004 417/44.1 |
| 2005/0156053 | A1 | | 7/2005 | Melink |
| 2005/0280384 | A1 | * | 12/2005 | Sulfstede .................. 318/432 |
| 2008/0045132 | A1 | | 2/2008 | Livchak et al. |
| 2008/0119126 | A1 | * | 5/2008 | Shizuo .............. F04D 27/004 454/75 |
| 2008/0161976 | A1 | * | 7/2008 | Stanimirovic ...... F24F 11/0086 700/276 |
| 2009/0048714 | A1 | * | 2/2009 | Hanawalt ................. 700/275 |
| 2010/0009621 | A1 | * | 1/2010 | Hsieh ...................... 454/293 |
| 2012/0009863 | A1 | * | 1/2012 | Sun ....................... H02P 6/06 454/228 |
| 2013/0297079 | A1 | * | 11/2013 | Tamminen .......... F24F 11/0001 700/276 |

FOREIGN PATENT DOCUMENTS

| | | |
|---|---|---|
| GB | 2457534 A | 8/2009 |
| IN | 1791DELNP2013 A | 10/2014 |
| JP | 2004-205191 A | 7/2004 |
| JP | 2004-263949 A | 9/2004 |
| JP | 2005-300089 A | 10/2005 |
| JP | 2010-216797 A | 9/2010 |
| RU | 2584517 C2 | 5/2016 |
| WO | WO-98/04835 A1 | 2/1998 |
| WO | WO-2006002190 A2 | 1/2006 |
| WO | WO-2012/030997 A2 | 3/2012 |

OTHER PUBLICATIONS

Marshall Brain, How does a brushless electric motor work?, Webpage, Oct. 30, 2008, pp. 1-3, HowStuffWorks, Inc.
International Search Report completed Apr. 12, 2012.
"European Application Serial No. 11822585.3, Response filed Jul. 31, 2014 Office Action mailed Feb. 7, 2014", 14 pgs.
"European Application Serial No. 11822585.3, Amendment filed Feb. 27, 2013", 4 pgs.
"European Application Serial No. 11822585.3, Office Action malied Feb. 7, 2014", 1 pg.
"International Application Serial No. PCT/US2011/050021, International Preliminary Report on Patentability dated", 5 pgs.
"International Application Serial No. PCT/US2011/050021, Written Opinion mailed Apr. 13, 2012", 4 pgs.
"Singapore Application Serial No. 201301473-3, Search Report mailed Jun. 13, 2014", 7 pgs.
"Singapore Application Serial No. 201301473-3, Written Opinion mailed Jun. 13, 2014", 10 pgs.
"International Application Serial No. PCT/US2011/050021, International Search Report mailed Apr. 13, 2012", 2 pgs.
"Russian Application Serial No. 2013113966, Office Action mailed Aug. 13, 2014", (w/ English Translation), 7 pgs.
"Russian Application Serial No. 2013113966, Office Action mailed Dec. 12, 2014", (w/ English Translation), 6 pgs.
"Russian Application Serial No. 2013113966, Response filed Oct. 16, 2014 to Office Action mailed Aug. 13, 2014", (w/ English Translation of Amendments), 40 pgs.
"Singapore Application Serial No. 201301473-3, Response filed Dec. 8, 2014 to Written Opinion", 11 pgs.
"Chinese Application Serial No. 201180043305.5, Office Action mailed Mar. 11, 2015", 7 pgs.
"Russian Application Serial No. 2013113966, Response filed Feb. 6, 2015 to Office Action mailed Dec. 12, 2014", (w/ English Translation of Claims), 12 pgs.
"Singapore Application Serial No. 201301473-3, Search and Examination Report filed Feb. 13, 2015", 10 pgs.
"European Application Serial No. 11822585.3, Extended European Search Report mailed Jan. 22, 2014", 6 pgs.
"European Application Serial No. 11822585.3, Office Action mailed Apr. 9, 2013", 2 pgs.
"Australian Application Serial No. 2011295983, Examination Report mailed Feb. 11, 2016", 4 pgs.
"European Application Serial No. 11822585.3, Office Action mailed Feb. 19, 2016", 5 pgs.
"Mexican Application Serial No. MX/a/2013/002385, Office Action mailed Mar. 29, 2016", (w/ English Translation), 8 pgs.
"Mexican Application Serial No. MX/a/2013/002385, Response filed Jan. 7, 2016 to Office Action mailed Aug. 28, 2015", (w/ English Translation of Claims), 17 pgs.
"Chinese Application Serial No. 201180043305.5, Response filed Jul. 27, 2015 to Office Action mailed Mar. 11, 2015", (w/ English Translation of Amended Claims), 12 pgs.
"Chinese Application Serial No. 201180043305.5, Office Action mailed Nov. 9, 2015", (w/ English Summary), 7 pgs.
"Mexican Application Serial No. MX/a/2013/002385 Response filed Jun. 18, 2015 to Office Action mailed Mar. 26, 2015", (w/ English Translation of Amended Claims), 17 pgs.
"Mexican Application Serial No. MX/a/2013/002385, Office Action mailed Mar. 26, 2015", (w/ English Summary), 5 pgs.
"Mexican Application Serial No. MX/a/2013/002385, Office Action mailed Aug. 28, 2015", (w/ English Summary), 8 pgs.
"Russian Application Serial No. 2013113966, Office Action mailed Apr. 16, 2015", (w/ English Translation), 7 pgs.
"Russian Application Serial No. 2013113966, Response filed Oct. 14, 2015 to Office Action mailed Apr. 16, 2015", (w/ English Translation of Amended Claims), 13 pgs.
"Mexican Application Serial No. MX/a/2013/002385 Response filed Jun. 27, 2015 to Office Action mailed Mar. 26, 2015", With the Spanish claims, 13 pgs.
"Mexican Application Serial No. MX/a/2013/002385, Office Action mailed Mar. 26, 2015", 3 pgs.
"Russian Application Serial No. 2013113966, Office Action mailed Apr. 16, 2015", 7 pgs.
"Russian Application Serial No. 2013113966, Response filed Oct. 14, 2015 to Office Action mailed Apr. 16, 2015", 9 pgs.
"Australian Application Serial No. 2011295983, Response filed Aug. 9, 2016 to Examination Report mailed Feb. 11, 2016", 13 pgs.
"Chinese Application Serial No. 201180043305.5, Office Action mailed Apr. 14, 2016", 5 pgs.
"Chinese Application Serial No. 201180043305.5, Response filed Jun. 28, 2016 to Office Action mailed Apr. 14, 2016", W/ English Translation of Claims, 12 pgs.
"European Application Serial No. 11822585.3, Response filed Jun. 29, 2016 to Office Action mailed Feb. 19, 2016", 10 pgs.
"Australian Application Serial No. 2011295983, Response filed Jan. 25, 2017 to Examination Report mailed Oct. 13, 2016", 8 pgs.
"European Application Serial No. 11822585.3, Communication Pursuant to Article 94(3) EPC dated Feb. 15, 2017", 5 pgs.

* cited by examiner

*1500CFM RATED*

| DUCT SIZE | 75% | 90% | RATING |
|---|---|---|---|
| | 1125 CFM | 1350 CFM | 1500 CFM |
| 6" ROUND | 15' | 4' | 1' |
| 3.25" X 10" | 15' | 4' | 1' |
| 3.25" X 14" | 31' | 9' | 1' |
| 7" ROUND | 33' | 9' | 1' |
| 8" ROUND | 65' | 19' | 3' |
| 10" ROUND | 201' | 59' | 9' |

*1200CFM RATED*

| DUCT SIZE | 75% | 90% | RATING |
|---|---|---|---|
| | 900 CFM | 1080 CFM | 1200 CFM |
| 6" ROUND | 18' | 7' | 1' |
| 3.25" X 10" | 18' | 7' | 1' |
| 3.25" X 14" | 38' | 14' | 2' |
| 7" ROUND | 39' | 15' | 2' |
| 8" ROUND | 77' | 29' | 5' |
| 10" ROUND | 237' | 89' | 15' |

*600CFM RATED*

| DUCT SIZE | 75% | 90% | RATING |
|---|---|---|---|
| | 450 CFM | 540 CFM | 600 CFM |
| 6" ROUND | 76' | 33' | 4' |
| 3.25" X 10" | 76' | 33' | 4' |
| 3.25" X 14" | 158' | 69' | 9' |
| 7" ROUND | 165' | 73' | 9' |
| 8" ROUND | 321' | 142' | 18' |
| 10" ROUND | 966' | 428' | 54' |

*500CFM RATED*

| DUCT SIZE | 75% | 90% | RATING |
|---|---|---|---|
| | 375 CFM | 450 CFM | 500 CFM |
| 6" ROUND | 67' | 26' | 6' |
| 3.25" X 10" | 67' | 26' | 6' |
| 3.25" X 14" | 137' | 54' | 12' |
| 7" ROUND | 144' | 57' | 13' |
| 8" ROUND | 279' | 110' | 25' |
| 10" ROUND | 834' | 331' | 76' |

*160CFM RATED*

| DUCT SIZE | 75% | 90% | RATING |
|---|---|---|---|
| | 120 CFM | 144 CFM | 160 CFM |
| 6" ROUND | 168' | 84' | 50' |
| 3.25" X 10" | 168' | 84' | 50' |
| 3.25" X 14" | 340' | 171' | 101' |
| 7" ROUND | 355' | 179' | 106' |
| 8" ROUND | 679' | 342' | 202' |
| 10" ROUND | 1989' | 1006' | 596' |

*FIG. 4*

VENTILATION UNIT CALIBRATION APPARATUS, SYSTEM AND METHOD

FIELD OF THE INVENTION

The present invention relates to ventilation unit performance, and more particularly, to an apparatus, system and method for calibrating a ventilation unit to achieve a desired flow rate in any of a variety of installation environments.

SUMMARY

In some embodiments, the present invention provides a ventilation unit for installation in a ventilation system. The ventilation unit can include a motor coupled to a fan element and a power source. The ventilation unit can also include a calibration module coupled to the motor and having a power regulator for adjusting the performance of the ventilation unit based on at least one characteristic of the ventilation system.

The present invention also provides a method of calibrating a performance rated ventilation unit including determining at least one characteristic of a ventilation system. The method can also include regulating power supplied to the ventilation unit based on the at least one characteristic of the ventilation system determined to satisfy the performance rating of the ventilation unit.

In some embodiments, the present invention provides a method of installing a performance rated ventilation unit including connecting a ventilation unit to a ventilation system and assessing at least one characteristic of a ventilation system and a power supply capacity of a power source. The method can also include adjusting a power supplied to the ventilation unit based on the at least one characteristic of the ventilation system determined to satisfy the performance rating of the ventilation unit.

Other aspects of the invention will become apparent by consideration of the detailed description and accompanying drawings.

BRIEF DESCRIPTION OF THE DRAWINGS

FIG. 4 is a set of charts illustrating the equivalent ductwork for achieving levels of performance for each of five performance-rated ventilation units.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Also, it is to be understood that phraseology and terminology used herein with reference to device or element orientation (such as, for example, terms like "central," "upper," "lower," "front," "rear," and the like) are only used to simplify description of the present invention, and do not alone indicate or imply that the device or element referred to must have a particular orientation. In addition, terms such as "first" and "second" are used herein for purposes of description and are not intended to indicate or imply relative importance or significance.

Figure 1:
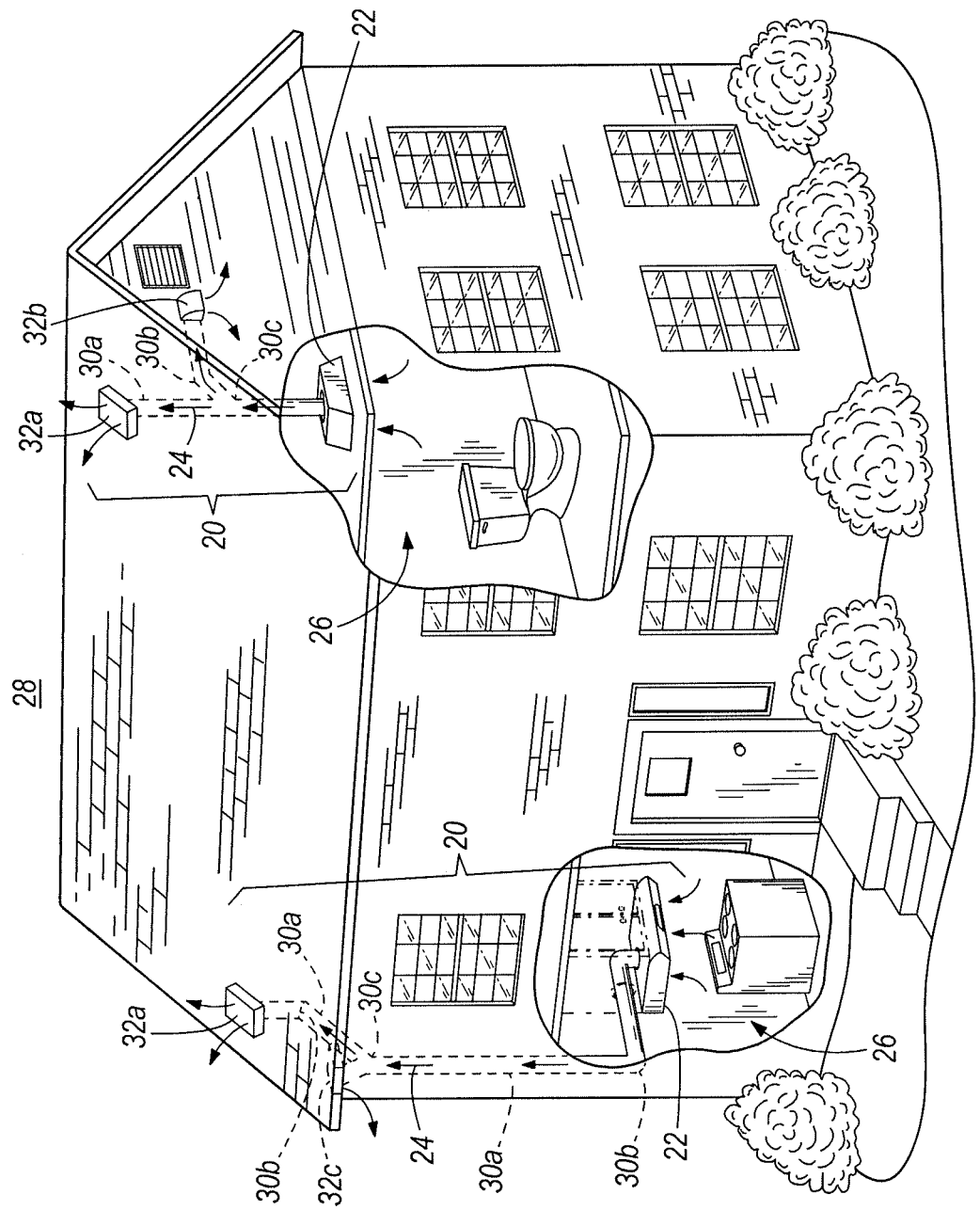
FIG. 1 is a partially cut-away view of exemplary installation environments for a ventilation unit according to some embodiments of the present invention.

FIG. 1 illustrates an installation environment including two ventilation systems 20, each of which can include a ventilation unit 22 according to embodiments of the present invention. While the installation environment shown in FIG. 1 is a house, a ventilation system 20 and unit 22 can be installed in any building or structure including, but not limited to residential units, office buildings, factories, storage units, out buildings, etc., to enable movement of air (gas, fumes, air borne particulate matter, etc.) along a flow path 24 between a first space 26 and a second space 28.

As shown in FIG. 1, the first and/or second space 26, 28 can be generally defined as the interior or exterior of a building or a room or group of rooms within a building. In some embodiments, the first and/or second space 26, 28 can be defined as a volume adjacent at least a portion of the ventilation unit 22, or more specifically as a volume extending between a portion of the ventilation unit 22 and another unit, such as a stove or shower stall. In other embodiments, the first and/or second space 26, 28 can be defined by an enclosed space, such as by a fume hood or a building ventilation conduit.

Ventilation systems 20 can have various configurations depending on the installation environment and the requirements of the system. A ventilation system 20 can include a duct arrangement 30 to provide a conduit for the air flow 24 between the first space 26 and the second space 28. The duct arrangement 30 can include ductwork with at least one straight portion 30a and/or at least one angled portion 30b.

Figure 1A:
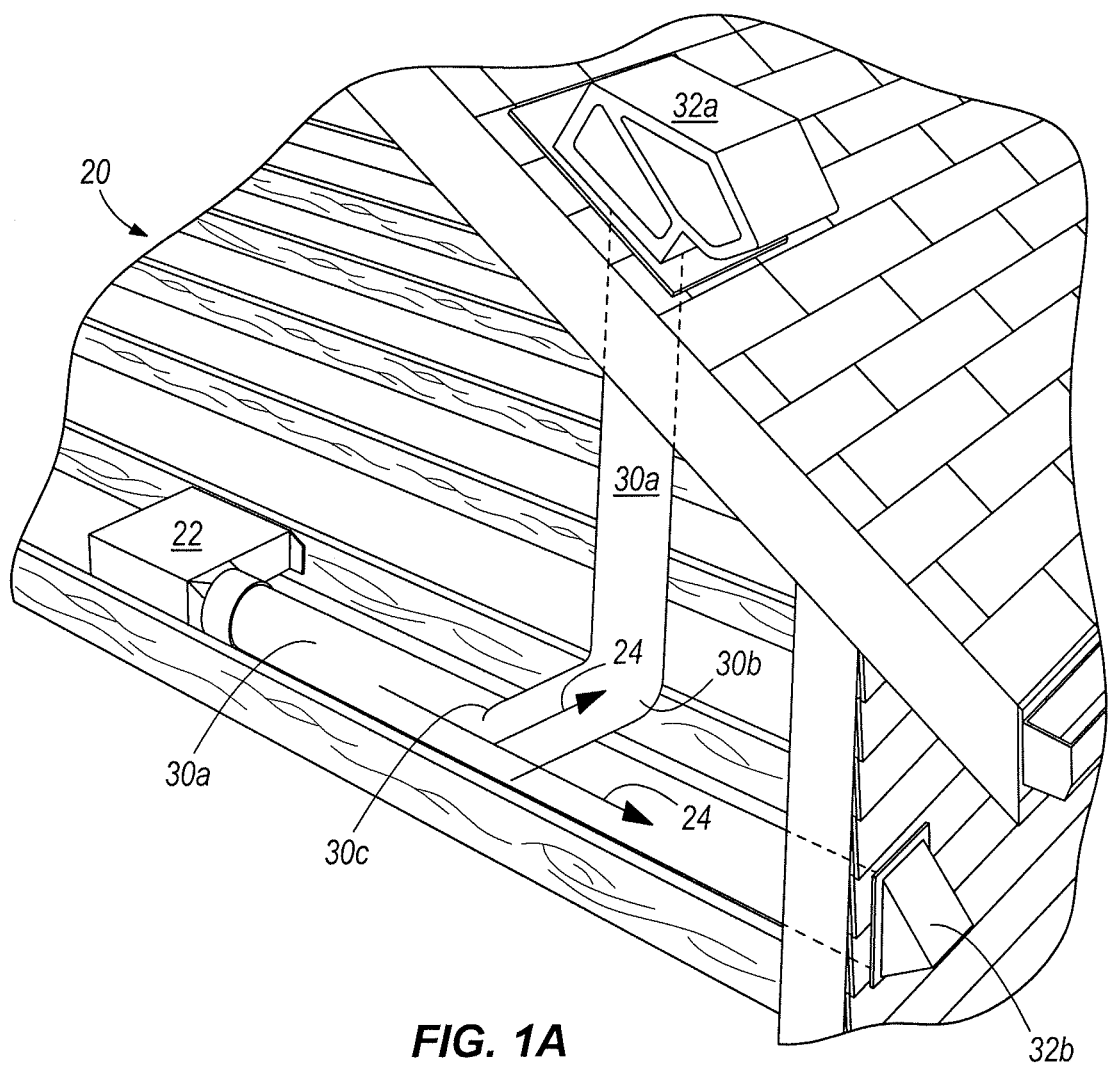
FIG. 1A is an exemplary configuration of a ventilation system in an exemplary installation environment according to some embodiments of the present invention.

Each angled portion 30b can express any of a range of angles, though 90 to 135 degree angled portions 30b are most common. The cross-sectional shape and cross-sectional area of the duct portions 30a, 30b, as well as the material from which they are formed can vary depending on the installation environment and the requirements of the system. For example, the duct arrangement 30 can be comprised of rigid and/or flexible materials as generally known in the art. Further, a duct arrangement 30 can include one or more joint portions 30c that can connect various other portions of a duct arrangement 30 or ventilation system 20, as shown in FIGS. 1 and 1A.

The duct arrangement 30 can be connected to a ventilation unit 22 at an end adjacent to or associated with the first space 26 and a termination fitting 32 at an end adjacent to or associated with the second space 28. In some embodiments, the termination fitting 32 can provide a moveable barrier, which can selectively allow air flow 24 from the duct arrangement 30 to exit into the second space 28. The termination fitting 26 can prevent back draft of air from the second space 28 into the duct arrangement 30. In other embodiments, the termination fitting 32 can provide a partial barrier (e.g., a screen, mesh, cage bracket, etc.) to prevent animals and/or insects from entering the flow path 24. In still other embodiments, the termination fitting 32 can provide an alternate-shaped outlet from the duct arrangement 30 for the air flow 24. In embodiments of ventilation systems 20 including a joint portion 30c, the air flow path 24 can diverge to multiple termination fittings 32 and/or converge from multiple intakes. As shown in FIG. 1, the termination fitting 32 can be a roof cap 32a mounted to the roof of a building or a soffit cap 32c mounted to a soffit of a building with a roof. However, depending on the location of the end the duct arrangement 30 adjacent to or associated with the second space 28 of a particular embodiment, the termination fitting 32 can alternatively be provided in a wall, as shown in FIG. 1A, or other structure which at least partially defines the second space 28.

Figure 1C:
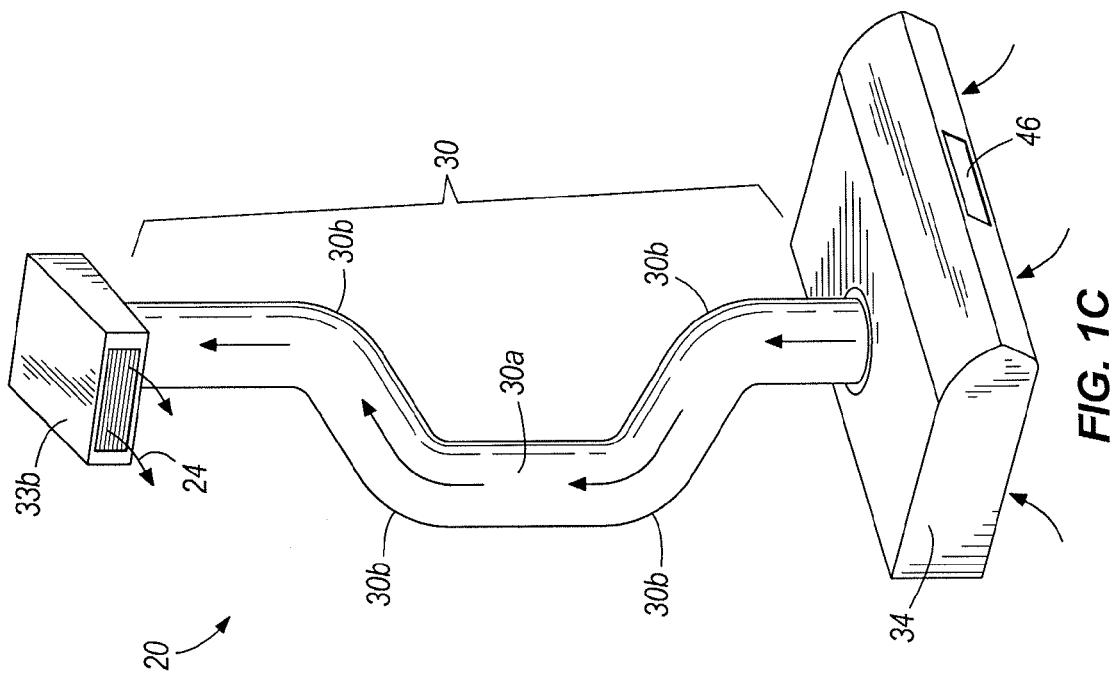
FIGS. 1B and 1C are exemplary configurations of ventilation systems according to some embodiments of the present invention.
Figure 1B:
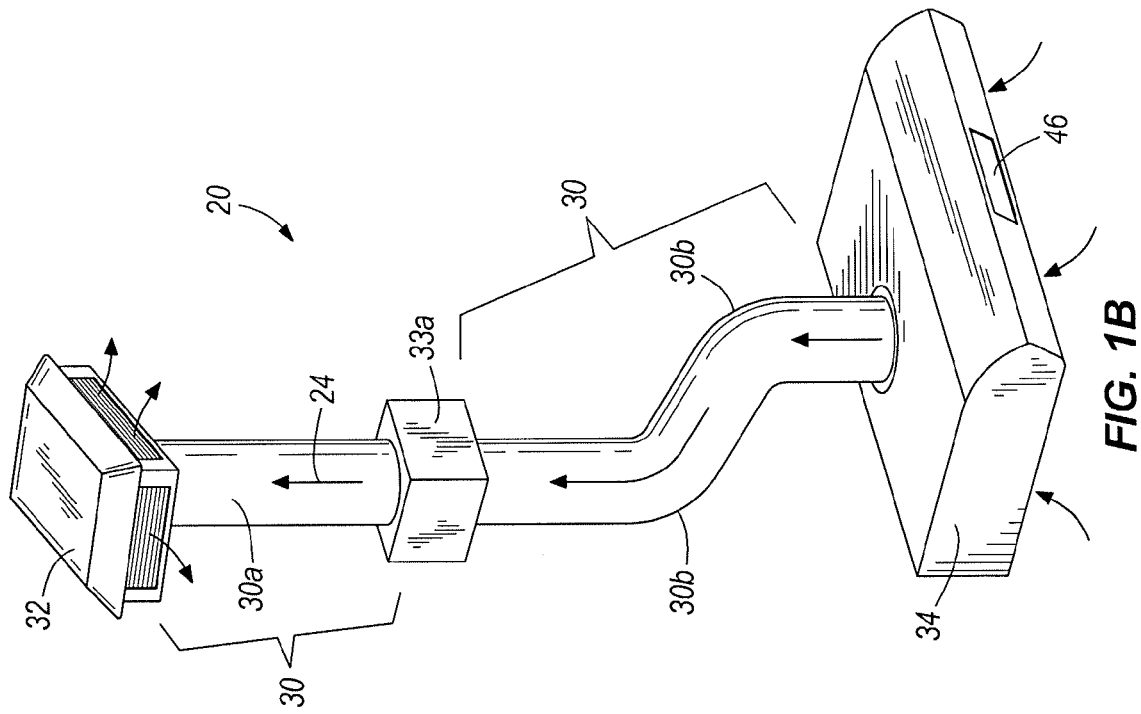

FIGS. 1B and 1C illustrate two additional examples of ventilation systems according to the present invention. As shown in FIG. 1B, an in-line blower 33a can be positioned between duct portions 30a, 30b and thereby be connected to a termination fitting 32 and an intake 34. Alternately, as shown in FIG. 1C, an external blower 33b can be connected by a duct arrangement 30 to an intake 34 and function as a termination fitting. Intake 34 can comprise a simple fixture such as a hood, grate, vent plate, etc., or the intake 34 can itself be a ventilation unit 22 as described in further detail below.

The ventilation systems of FIGS. 1B and 1C can be configured for various installation environments as described above with respect to FIG. 1. For example, the in-line blower 33a of FIG. 1B can be located in a basement, closet, intra-wall space, cabinet, or attic, among other places, and the duct arrangements 30 that connect the intake 34 to the in-line blower 33a and the blower 33a to the termination fitting 32 can include one or more straight portion 30a and/or angled portion 30b. The external blower 33b of FIG. 1C can be can be mounted to a wall or other structure which at least partially defines the second space 28 (e.g., a roof or wall immediately adjacent to the second space 28) and the duct arrangement 30 that connects the intake 34 to the external blower 33b can include one or more straight portion 30a and/or angled portion 30b.

Figure 2A:
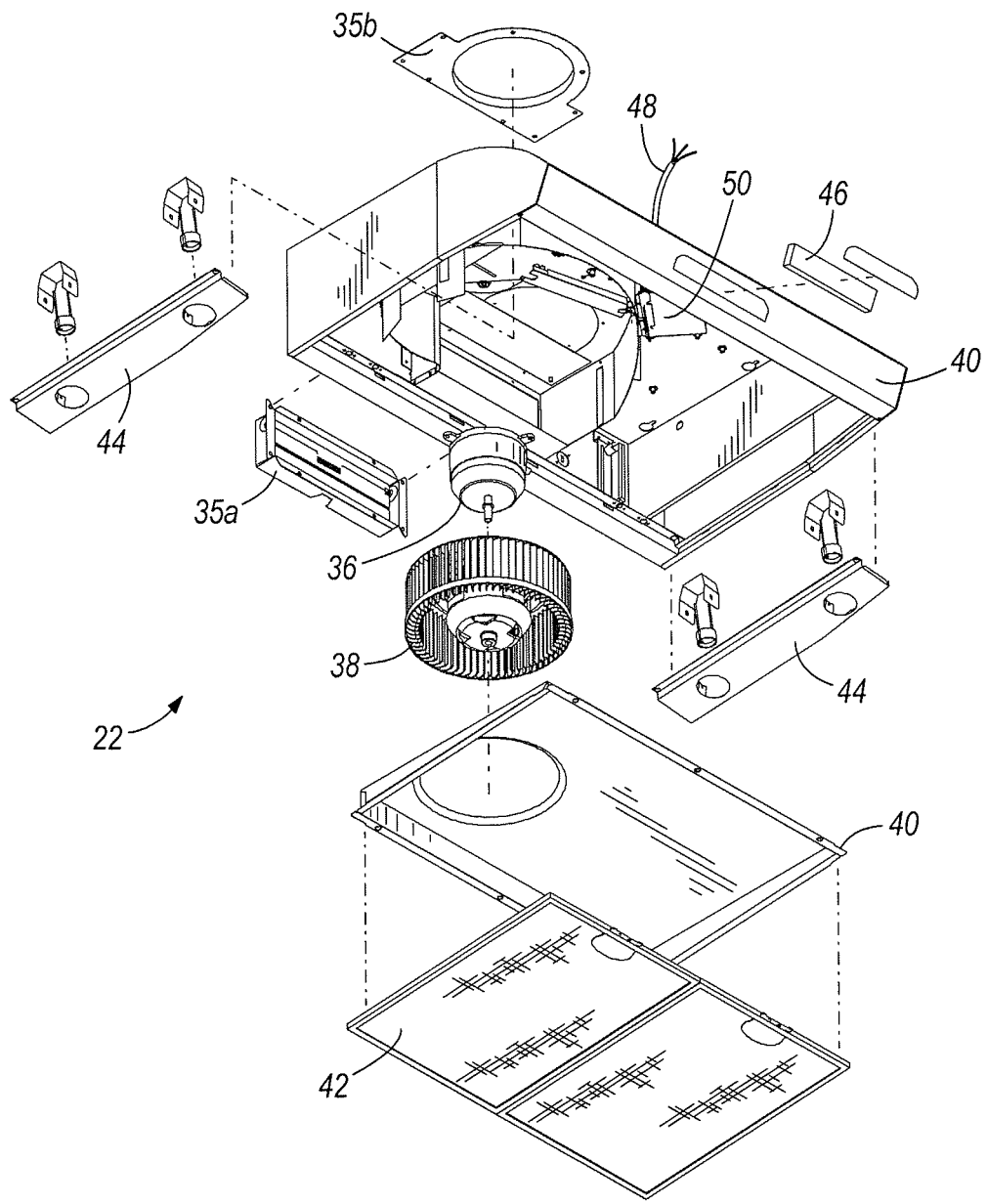
FIG. 2A is an exploded view of a ventilation unit according to some embodiments of the present invention.
Figure 2B:
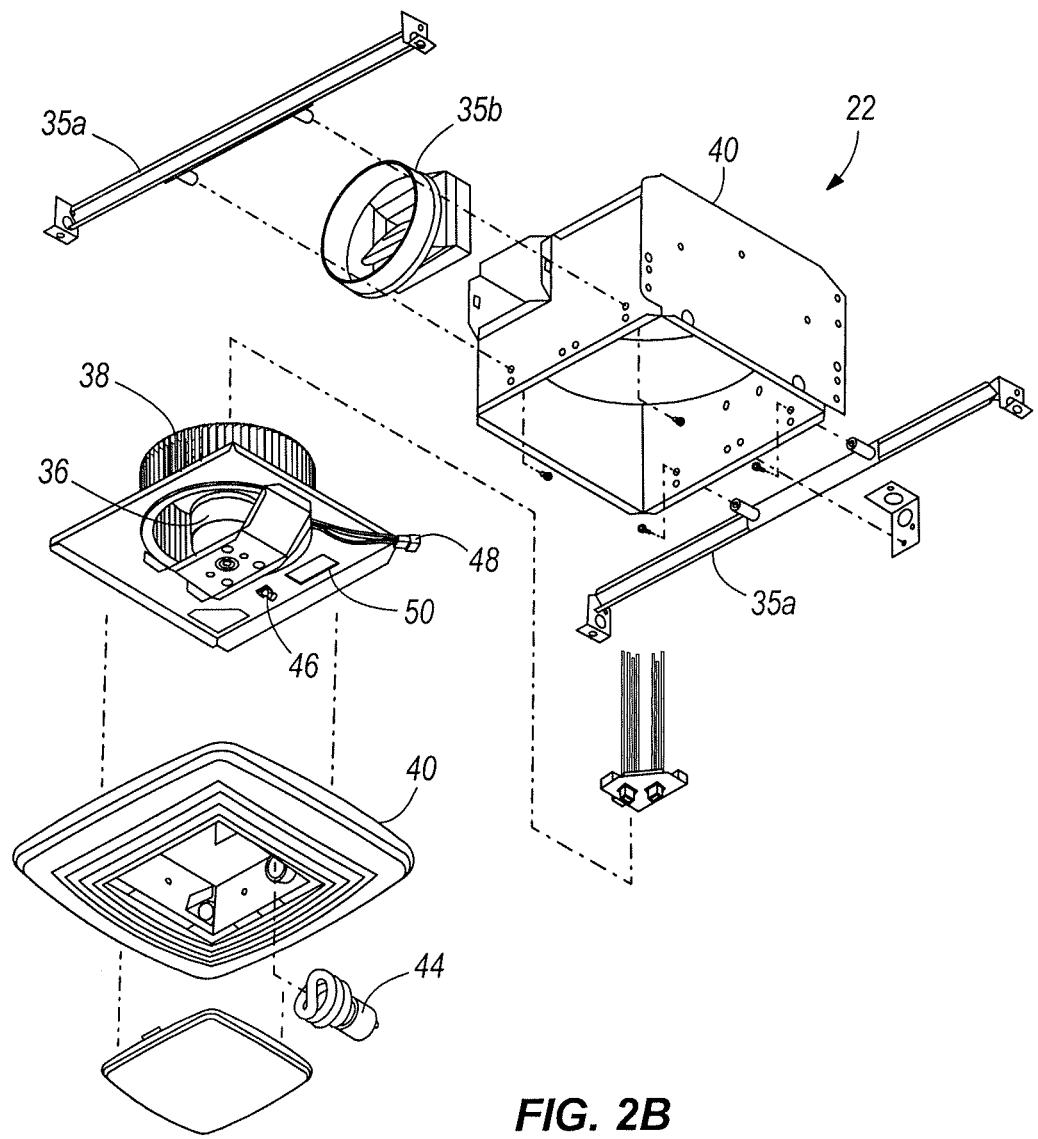
FIG. 2B is an exploded view of a ventilation unit according to some embodiments of the present invention.

While the following description refers to a particular ventilation unit 22, namely a range hood such as the one illustrated in FIG. 2A, or a bathroom vent fan such as the one illustrated in FIG. 2B, it should be understood that the present invention is applicable to a wide variety of ventilation units 22. For example, in some embodiments the ventilation unit 22 can be an exhaust or air intake fan (FIG. 1A), a vent hood, an in-line blower 33a (FIG. 1B), an external blower 33b (FIG. 1C), or similar unit which functions to move air from one space to another. The ventilation unit 22 can have any of various sizes, shapes, and configurations known in the art. As shown in FIG. 1, the ventilation unit 22 can be mounted to a cabinet or ceiling of a room. However, depending on the location of the end of the duct arrangement 30 adjacent to or associated with the first space 26 of a particular embodiment, the ventilation unit 22 can be mounted to a wall or other structure which at least partially defines the first space 26 as illustrated in FIG. 1A. As discussed above with respect to FIG. 1B, an in-line blower 33a can generally be located somewhere between the first and second spaces 26, 28, while an external blower 33b can generally be located adjacent to or in the second space 28, as discussed with respect to FIG. 1C.

As illustrated in FIGS. 2A and 2B, a ventilation unit 22 according to some embodiments of the present invention can be coupled to the duct arrangement 30 by one or more mounting plates/brackets 35a and duct connector 35b. The ventilation unit 22 can include a motor 36 coupled to a blower wheel 38 or similar fan element positioned in a housing 40. The motor 36 can be powered to move the blower wheel 38, thereby generating ventilation or air flow 24. The blower wheel 38 can be positioned/oriented within the ventilation unit 22 such that the air flow 24 is directed into or out of the duct arrangement 30.

In some embodiments, the motor 36 can be a brushless AC (BLAC), permanent magnet AC (PMAC), or brushless DC motor (BLDC). These types of motors are synchronous electric motors powered by either alternating current (AC) or direct current (DC) electricity and having an electronic commutation system, rather than a mechanical commutator and brushes, which results in improved motor efficiency and reduced mechanical wear, increasing the life of the motor. Current to torque and voltage to rpm are linear relationships in BLAC, PMAC, and BLDC motors. Brushless DC motors generally exhibit a reduced operating noise as compared to other types of motors suitable for driving a blower wheel 38 or similar fan element. Brushless AC and permanent magnet AC motors exhibit even further reduced operating noise as compared to brushless DC motors. These characteristics can be advantageous in a ventilation unit 22 which can require operation for extended periods of time in locations where background noise is undesirable. In addition, BLAC, PMAC, and BLDC motors provide reliable start-up and continual operation and controllability at very low speeds. In some embodiments, an interface can be provided to convert an AC power signal which would be used to control an AC induction motor to a usable input to control a BLAC, PMAC, or BLDC motor. Of course, it should be understood by one of skill in the art that various embodiments of the invention can alternatively utilize other types of motors.

As shown in FIG. 2A, a ventilation unit 22 according to some embodiments of the invention can include one or more filter elements 42 positioned along the air flow path 24. In some embodiments, such as those illustrated in FIGS. 2A and 2B, the ventilation unit 22 can include one or more lights 44 for illuminating a space adjacent to the unit 22. The lights 44 can be selectively turned on and off via a user interface 46 positioned on the housing 40 or other component of the unit 22. The speed of the motor 36 driving the blower or fan 38 can be adjusted via a user interface 46. The user interface can consist of one or more switches, dials, buttons, touch screens, displays, indicators, etc., or any combination thereof. In other embodiments, the lights and/or motor speed can be controlled by a user interface 46 positioned remotely from the ventilation unit 22 (e.g., mounted on a wall or cabinet). In further embodiments, the operation of the ventilation unit 22 can be controlled by a user via any one of multiple interfaces 46 positioned on, near, or remotely from the unit 22.

A ventilation unit 22 can include a connection 48 to a power source, either directly (e.g., to a building electrical system) or indirectly (e.g., through a cord connected to a building electrical system through an electrical outlet). Operation of the lights 44 and/or motor 36 can be effected by a control unit 50. In some embodiments, the control unit 50 is a power regulator (e.g., voltage or current regulator), a controller or microprocessor, one or more fuses, sensors and/or switches, or some combination of various ones of these elements. The element or elements comprising the control unit 50 can be mounted on a circuit board and secured to the housing 40 or other component of the ventilation unit 22. Electrical connections can be provided to couple the motor 36 to the power connection 48 through the control unit 50. The user interface 46 can be coupled to the control unit 50, as can the light or lights 44. In alternative embodiments, the control unit 50, or elements thereof can be located remotely from the ventilation unit 22. For example, the control unit 50 (or elements of thereof) can be provided integrally with a remotely located user interface that is mounted in a wall, cabinet, or similar structure. In some embodiments the user interface 46 can be a remote control which interacts with the unit 22 via infrared (IR) or radio frequency signals (RF).

A ventilation unit 22 can be rated to perform at a certain level (i.e., generate a particular flow rate). As an industry standard, range hood performance is typically rated and advertised at a static pressure of 0.1" Wg. This industry-wide standard theoretically enables a simple comparison of range hood models across various brands and manufacturers. The 0.1" Wg static pressure rating point was selected by the residential ventilating industry in the 1950's, at a time when typical residential exhaust ventilators were low flow (under 100 cfm), and were coupled to short duct arrangements 30 of rigid galvanized ductwork.

However, many residential range hoods presently on the market ventilate at a much higher flow rate, are coupled to longer duct arrangements 30 of varying cross-sectional area, and include termination fittings 32 with back draft dampers utilizing a wide variety of sizes and cross-sectional areas. The static pressure associated with a particular ventilation system 20 can vary greatly depending on the physical characteristics and arrangement of the system components.

Figure 3A:
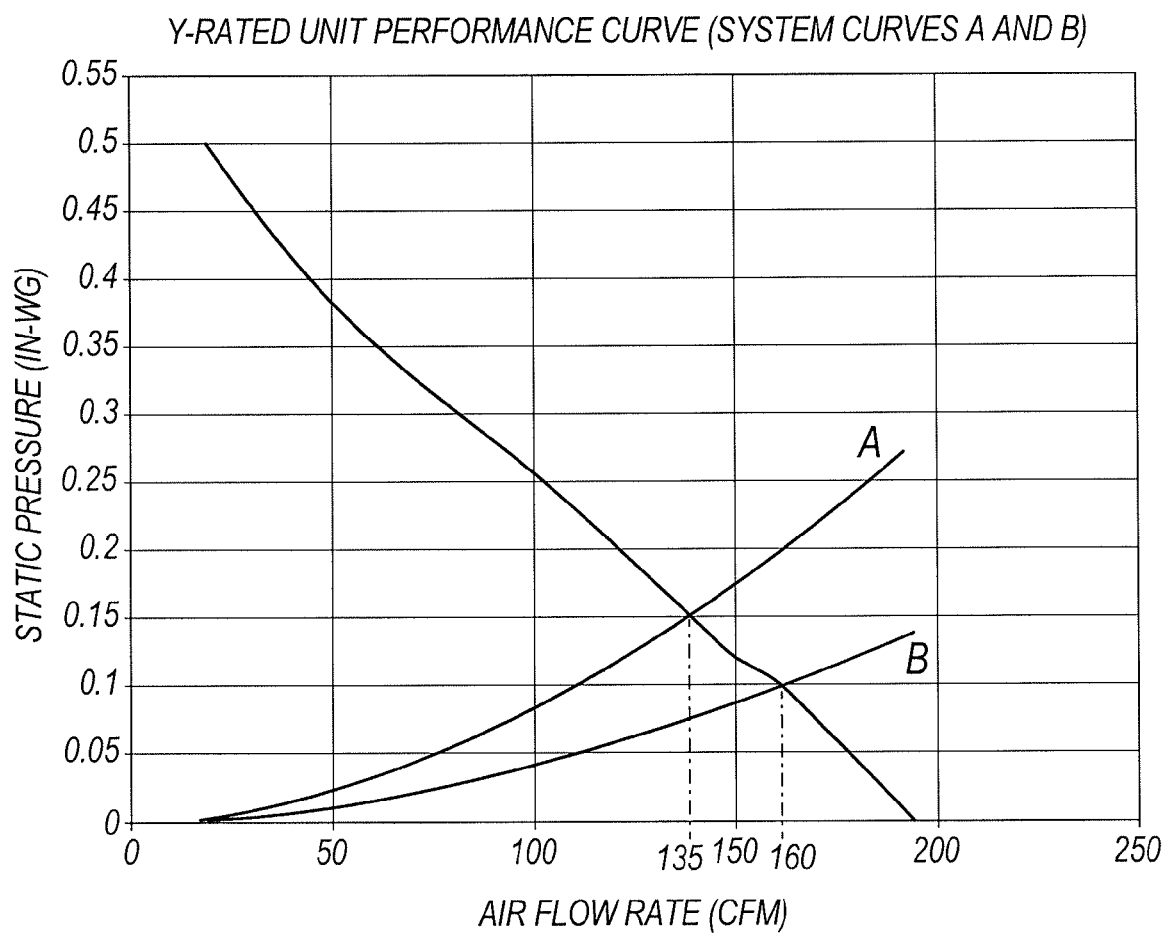
FIG. 3A is a graph illustrating the performance of a ventilation unit in two different ventilation systems.

FIG. 3A depicts the performance curve for a unit rated to operate at a particular "Y" level. In other words, the curve represents the air flow rate 24 produced by the "Y"-rated unit at various static pressures. As illustrated, the higher the static pressure experienced by the ventilation unit "Y," the lower the air flow rate (i.e., air flow rate is inversely related to static pressure).

In FIG. 3A, system curves "A" and "B" represent the characteristics of particular ventilation systems 20. A system curve can vary depending on cross-sectional area of the flow path through the duct system 30; the length of the flow path through the system 30; the configuration, orientation, and materials of straight, angled, and jointed portions 30a, 30b, 30c; and the effects of a filter 42 and/or damped termination fitting, among others. Essentially, the characteristics of a particular ventilation system 20 can affect the performance of the ventilation unit 22 (i.e., whether the unit 22 ventilates above, below, or at its rated level). System curves that have a greater slope represent more restrictive systems or installation environments. As indicated by the intersection between the performance curve and each system curve, the "Y"-rated ventilation unit will generate a significantly lower air flow rate in system "A" than in system "B." For example, if the unit is rated at 160 cfm, then curve "B" can represent a system in which the performance equals the rating of the unit, and curve "A" can represent a system that is more restrictive (i.e., presents higher static pressure) than system "B." The discrepancies between the performance of the unit in system "A" vs. "B" can be attributed to one or more differences in the characteristics of the systems (i.e., duct arrangement 30, termination fitting type 32, etc.), which are described above.

Figure 3B:
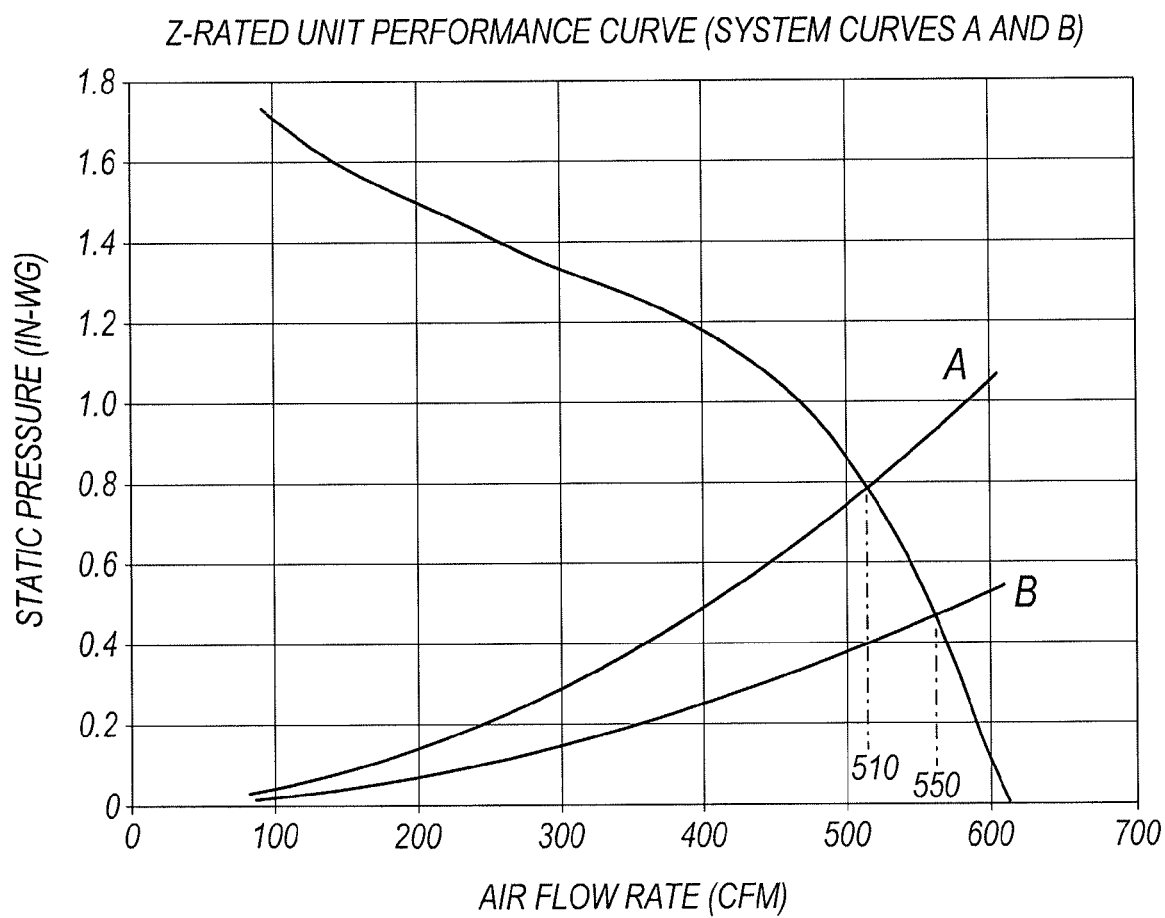
FIG. 3B is a graph illustrating the performance of a ventilation unit in two different ventilation systems.

FIG. 3B depicts the performance curve for a unit rated to operate at a particular "Z" level, which can be a number of times greater than the "Y" level of FIG. 3A. As illustrated, the "Z"-rated unit can have a performance curve that is much different from that of the "Y"-rated unit, though the air flow rate remains inversely related to the static pressure experienced by the unit.

In FIG. 3B, the "A" and "B" trend lines represent the system curves for systems with equivalent length but different diameter than those of ventilation systems "A" and "B" respectively, as discussed with respect to FIG. 3A. It should be noted that a higher flow unit (e.g., the "Z"-rated unit) generally utilizes a duct with a larger cross-sectional area than that of a lower flow unit (e.g., the "Y"-rated unit). As indicated by the intersection between the performance curve and each system curve, the "Z"-rated ventilation unit will generate a significantly lower air flow rate in system "A" than in system "B." For example, if the unit is rated at 600 cfm, then both curves "A" and "B" can represent systems in which the actual performance of the unit can not meet its performance rating, yet the unit can perform closer to the specified rating level in system "B" than in system "A" (i.e., system "A" is more restrictive than system "B").

In general, the greater the performance rating of the ventilation unit 22 or the static pressure of the system 20, the greater the likelihood that the ventilation unit 22 may not operate at the rated level in an installation environment. This situation may become more likely as both the performance rating of the ventilation unit 22 and the static pressure of the system 20 increase. For instance, if a duct arrangement having the same diameter and length is used with a high flow-rated unit and a low flow-rated unit, the high-flow rated unit will experience a much more significant decrease in performance than the low flow-rated unit. Simply increasing the cross-sectional area of a duct arrangement to accommodate a higher flow-rate unit has obvious practical limitations based on the installation environment.

FIG. 4 further illustrates the relationship between the configuration and characteristics of the ventilation system 20 and the actual performance of a performance-rated ventilation unit 22. Each chart contains data for one of five particularly rated ventilation units (i.e., 1500 cfm, 1200 cfm, 600 cfm, 500 cfm, and 160 cfm). The first column of each chart describes the cross-section of a duct arrangement 30. Columns 2-4 specify the maximum length (ft.) of equivalent ductwork that will enable generation of 75%, 90%, and 100% of the rated performance. For example, in order for a 1500 cfm rated ventilation unit 22 in a duct arrangement 30 comprising 8" diameter round rigid ductwork, the maximum equivalent length of the system is 3' of straight ductwork 30a. If the system 20 includes an angle portion 30b (equivalent to approximately 10' of straight ductwork 30a) and/or a termination fitting 32 (equivalent to approximately 25' of straight ductwork 30a), the ventilation unit 22 would not be capable of generating the rated air flow.

The present invention is designed to account for variations in the configurations and characteristics of ventilation systems 20 in order to provide a ventilation unit 22 with a realized (actual) performance that is equivalent to its performance rating under industry-standard evaluations. A ventilation unit 22 according to some embodiments of the present invention can include a calibration module 52 or method for this purpose. The calibration module 52 or method can be used to determine the power supply required by the ventilation unit 22 to generate an air flow rate equivalent to the performance rating of the unit 22 based on one or more characteristics of the ventilation system 20—characteristics which contribute to the static pressure experienced by the ventilation unit 22 due to the particular system 20.

According to various embodiments of the present invention, the calibration method can be implemented in software, hardware, or a combination thereof. For example, in embodiments of a ventilation unit 22 including a controller, the controller can be programmed to execute a calibration procedure. The controller can be a control unit 50 as illustrated in FIGS. 2A and 2B, be an element thereof, be a completely separate component, or include the control unit 50. A calibration procedure can be initiated automatically at each use, by connection of a control unit 50 to a power source during installation, or by input to a user interface 46 associated with the unit.

In some embodiments, the controller can be programmed to store data representing characteristics of the ventilation unit 22. For example, the power rating of the motor 36, the presence and type of a filter 42, the size and shape of the air flow path defined by the unit 22, the performance rating of the unit, rotational speed of the fan or motor, among other things (e.g., current, voltage, pressure, flow rate, torque, etc.). As should be understood by one of ordinary skill in the art, any or all of the data related to the ventilation unit 22 can alternatively be input to the controller via a user interface 46 at the time of installation or when calibration is desired. This information may be measured or known by the user (i.e., installer, user initiating calibration) or provided by the manufacturer.

Figure 6A:
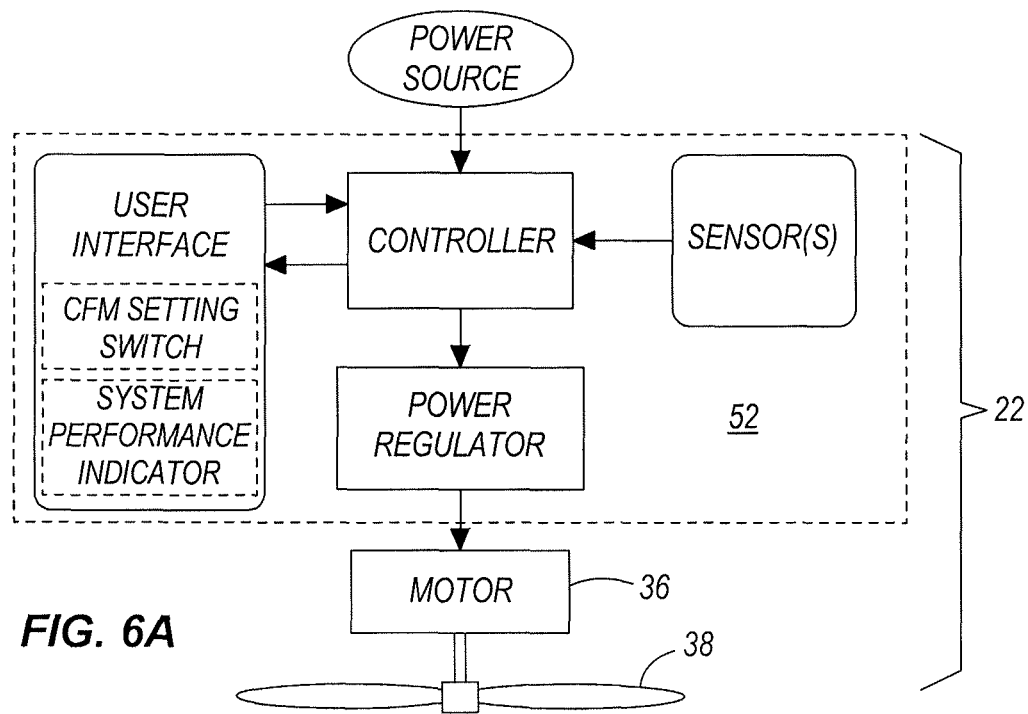
FIG. 6A is a system diagram of a ventilation unit according to some embodiments of the present invention.
Figure 6B:
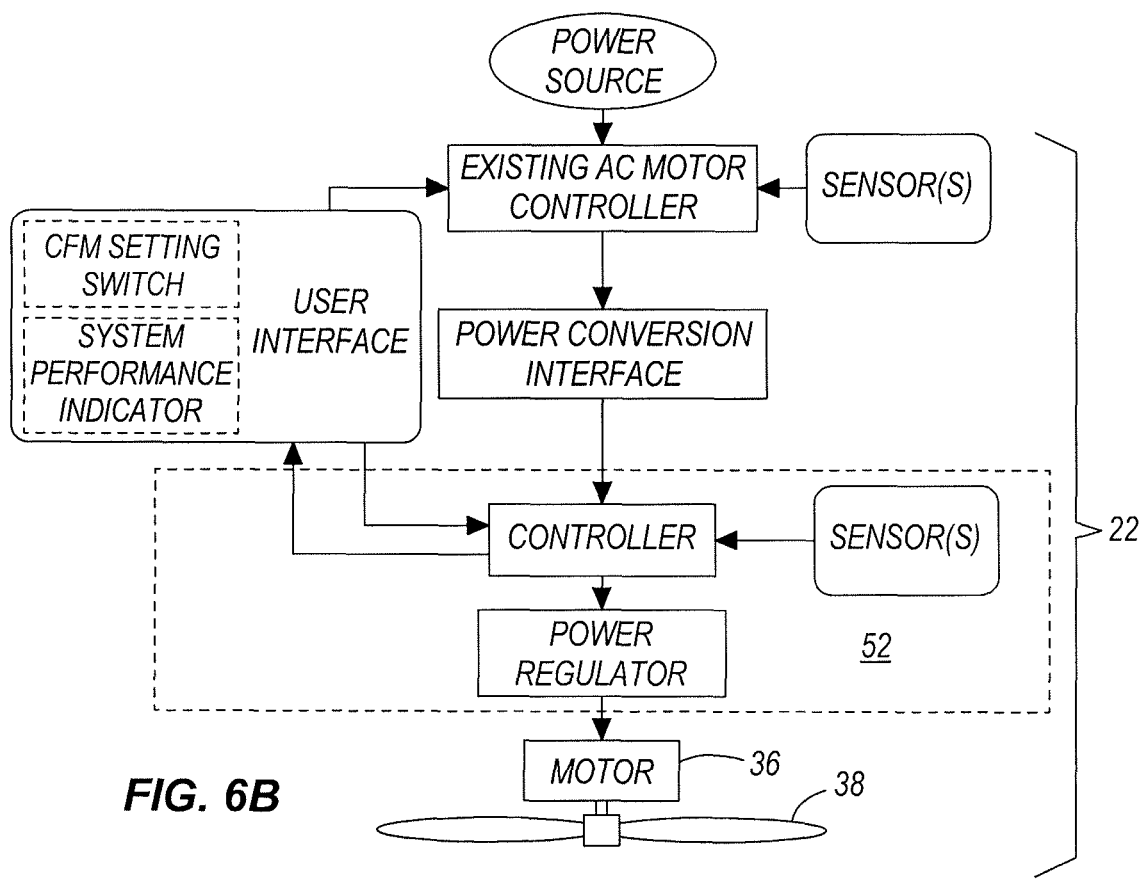
FIG. 6B is a system diagram of a ventilation unit according to some embodiments of the present invention.

As illustrated in the embodiments of FIGS. 6A and 6B, the calibration module 52 can include one or more sensors to provide data representative of one or more characteristics of the ventilation system 20. For example, the calibration module 52 can include one or more sensors to provide an output signal to the controller that can be representative of or used to determine the amount of power supplied to the ventilation unit 22 and/or the static pressure experienced by the unit 22, among other things. These sensors can include at least one flow rate sensor, rotational speed sensor, and current/voltage sensor, among others, or a combination thereof. As should be understood by one of ordinary skill in the art, any or all of the data related to the ventilation system 20 can alternatively be input to the controller via a user interface 46 at the time of installation or when calibration is desired. This information may be known or determined by the user with the use of various sensing/metering devices, by measurement or estimation, or a combination thereof. The user interface 46 can display data from the controller regarding the status of the system pertaining to operation and/or calibration of the system, and can have at least one indicator for this purpose. This data displayed can be from or regarding the one or more sensors, the power supply, power regulator, motor 36, fan 38, and/or the controller itself. In some embodiments, the calibration module 52 enables the user to adjust the system via the interface 46 in response to displayed data. The user interface 46 can also include a CFM setting switch which can enable the user/installer to set a minimum or off-mode ventilation rate to comply with environmental standards/codes and/or a maximum ventilation rate which can be used to adjust the performance of a ventilation unit 22 during calibration. A default setting for the CFM setting can be provided by the manufacturer or retailer. For ventilation units 22 with infinite speed control, the unit 22 can be designed to operate between the maximum ventilation rate and a minimum ventilation rate. For ventilation units 22 with discrete speed settings, the unit 22 can be designed to operate at determined percentages of a maximum set ventilation rate above a minimum ventilation rate.

The embodiment of FIG. 6B is representative of a calibration module that can be integrated into a ventilation unit 22 originally designed to use an AC motor. As illustrated in FIG. 6B, calibration module 52 can include a power conversion interface which can convert an AC power supply signal to a DC power supply signal. The DC power signal can be supplied to the power regulator via the controller. One or more sensors and a user interface 46 can provide inputs to both the existing AC motor controller and the calibration controller. In some embodiments, the existing AC motor controller can provide operational control of the ventilation unit 22 in response to user input, and the calibration controller and power regulator can provide the calibration-determined adjustment to the power signal provided by the AC motor controller via the power conversion interface. While FIG. 6B is directed to conversion of an AC motor controlled ventilation unit 22 to a DC motor controlled unit, it should be understood that the calibration module 52 and method can be integrated into or used with ventilation units 22 with various types of motors. For example, a ventilation unit 22 including an AC motor and pre-programmed AC motor controller does not require a power conversion interface in order to add the calibration module 52, but can otherwise be similar to the unit diagrammed in FIG. 6B.

Figure 6C:
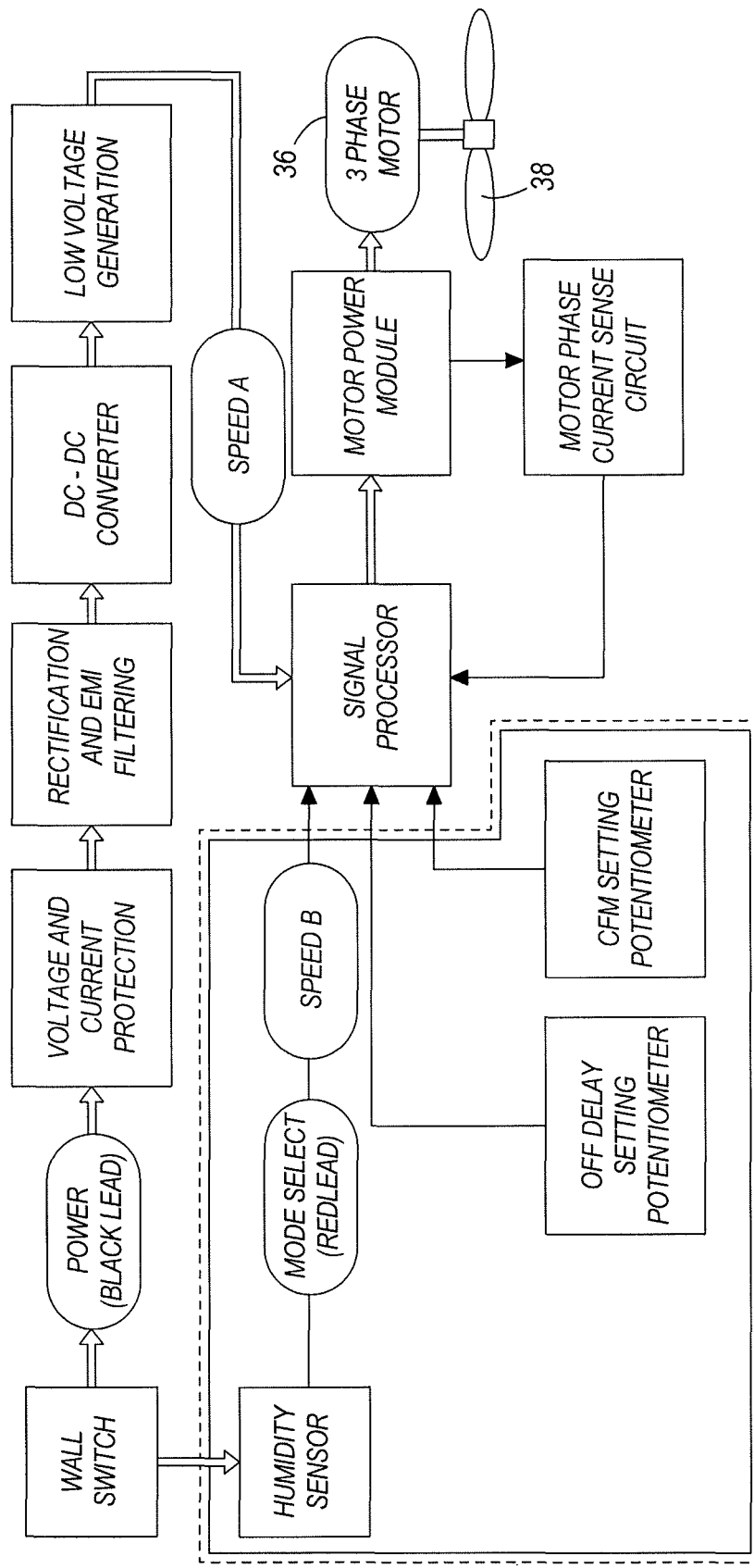
FIG. 6C is a system diagram of a ventilation unit according to some embodiments of the present invention.

FIG. 6C is a system diagram illustrating the operation of a ventilation unit 22 according to some embodiments of the invention. In some embodiments, the ventilation unit 22 can be designed to operate at a single speed. The diagram outside the dashed line box represents such a system, and can be used, for example, in a bathroom environment. A ventilation unit 22 can be turned on or off via a wall switch which provides power to a signal processor through a series of signal modifier stages. The signal processor can then provide the power necessary to drive a three phase motor 36 at a speed "A" via a motor power module. Brushless AC and permanent magnet AC are two types of motors 36 that can be used to rotate a blower wheel 38 or other fan element in a ventilation unit 22 according to the illustrated embodiment. A motor phase current sense circuit can provide feedback from the motor power module to the signal processor. In the embodiment illustrated in FIG. 6C, a calibration module can be integrated into the system, in the signal processor for example, and can be executed upon installation or activation of the system once or at each activation.

In some embodiments, the system illustrated in FIG. 6C can be designed to operate at multiple speeds and can incorporate the aspects of the diagram inside the dashed line box. In such an embodiment, speed "A" can be a very low ventilation level that can serve to satisfy environmental standards/codes, and speed "B" can be an operational ventilation level. The CFM setting potentiometer can enable the installer/user to set the desired speed "A." A humidity sensor can provide an automatic activation of the ventilation unit 22 in the event the unit 22 has not been activated via a wall switch and humidity reaches a certain level within the first space 26. An off delay setting potentiometer can also be set by the installer/user to deactivate or reduce the speed of the ventilation unit 22 after a period of time operating at speed "B" to speed "A". In such an embodiment, these elements can provide inputs to the signal processor in addition to those discussed above with respect to a single speed ventilation unit 22, and the remainder of the system can function as described above.

Figure 7:
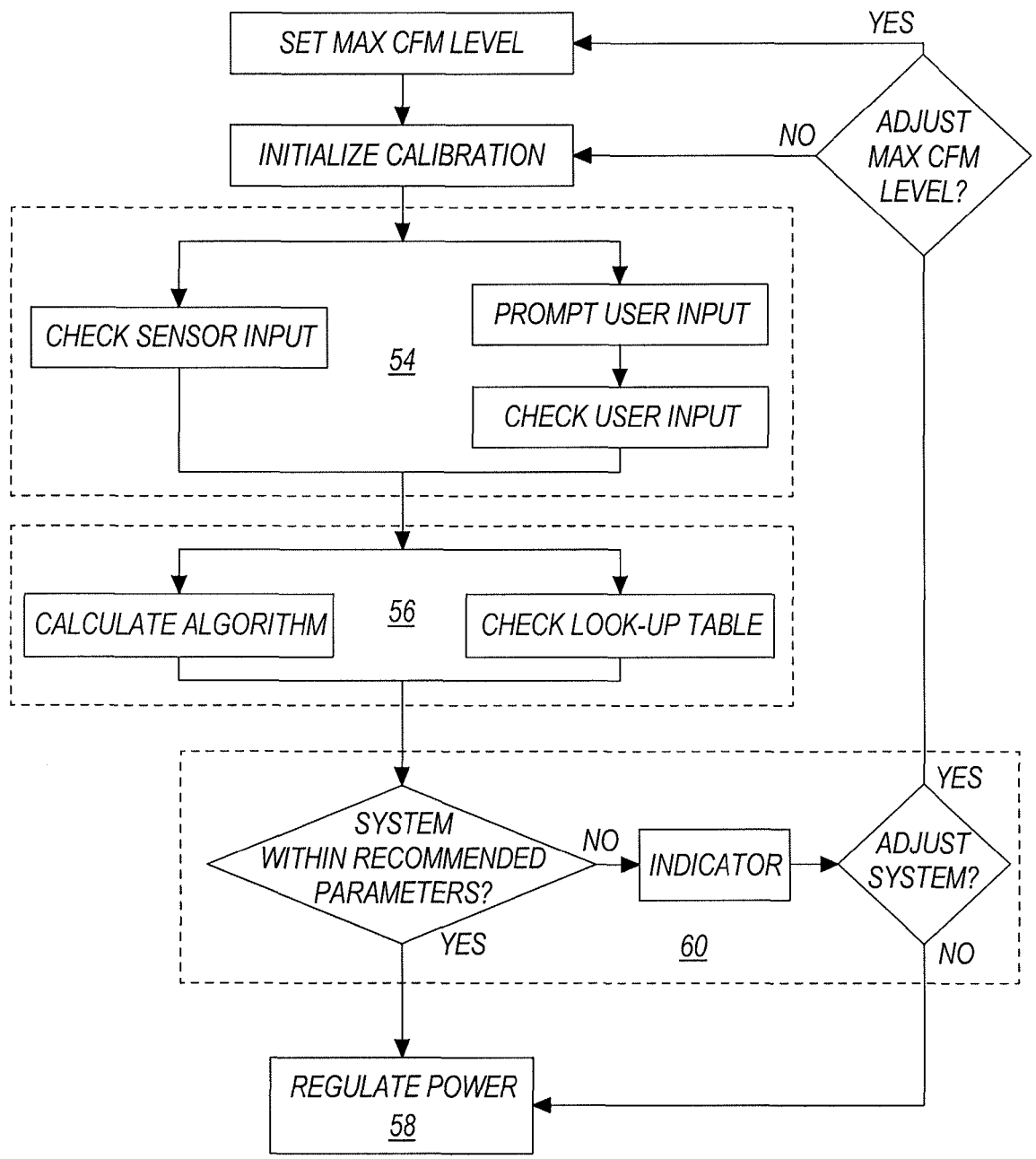
FIG. 7 is a flow chart illustrating a calibration method according to some embodiments of the present invention.

As illustrated by FIG. 7, the various methods discussed above in which information/data characterizing the ventilation system 20 is obtained are referred to as the data acquisition 54 portion of the calibration. As previously stated, data acquisition 54 can be performed by either one or a combination of hardware and software. The data programmed and/or input to the controller (by a user or sensors) can be used by the controller to determine the power supply necessary for the ventilation unit 22 to generate an air flow rate equivalent to a specified unit performance rating. This can be accomplished by calculation of one or more algorithms stored in the controller, by referencing one or more look-up tables, or by some combination thereof referred to as the data processing 56 portion of the calibration. Based on the results of the data processing 56, a system correction 58 can be made. For example, the system correction 58 can comprise regulation of the power supplied to the motor 36. In some embodiments, the controller is capable of regulating a voltage or current supplied to the motor 36 directly. In other embodiments, the controller can output a signal to one of a voltage or current regulator thereby controlling the power supplied to the motor 36 indirectly.

A feedback loop 60 can also be provided to indicate or warn the user/installer during calibration if the ventilation system is outside of pre-determined or manufacture recommended parameters. The warning can be visual (e.g., a light or error message on a display of a user interface 46) or audible (e.g., beep). The warning can be ignored, meaning that the ventilation unit will operate outside of the recommended parameters and exhibit non-optimal performance (i.e., reduced air flow rate, greater noise, etc.). Alternatively, the ventilation system can be adjusted (i.e., duct arrangement, termination fitting, power supply, etc.), and the calibration procedure can be repeated. In some embodiments, a maximum CFM setting can be adjusted to bring the unit performance into a realizable range based on the particular ventilation system in which it is operating. If the adjustments are such that the ventilation system parameters are still not within specifications, upon completion of data acquisition 54 and processing 56 the second time, the indicator will provide another warning, and the procedure can be reiterated.

According to some embodiments of the invention, the calibration procedure can be executed as follows. An operating curve of the ventilation unit 22 can be ascertained by supplying the motor 36 with varying amounts of current or voltage and determining the speed of or the air flow rate generated by the blower wheel or fan element 38 for each value of power supplied. The operating curve can be compared to the performance rating of the ventilation unit 22 to determine what value of power to supply the motor 36 with in order to generate the desired air flow rate.

Figure 5:
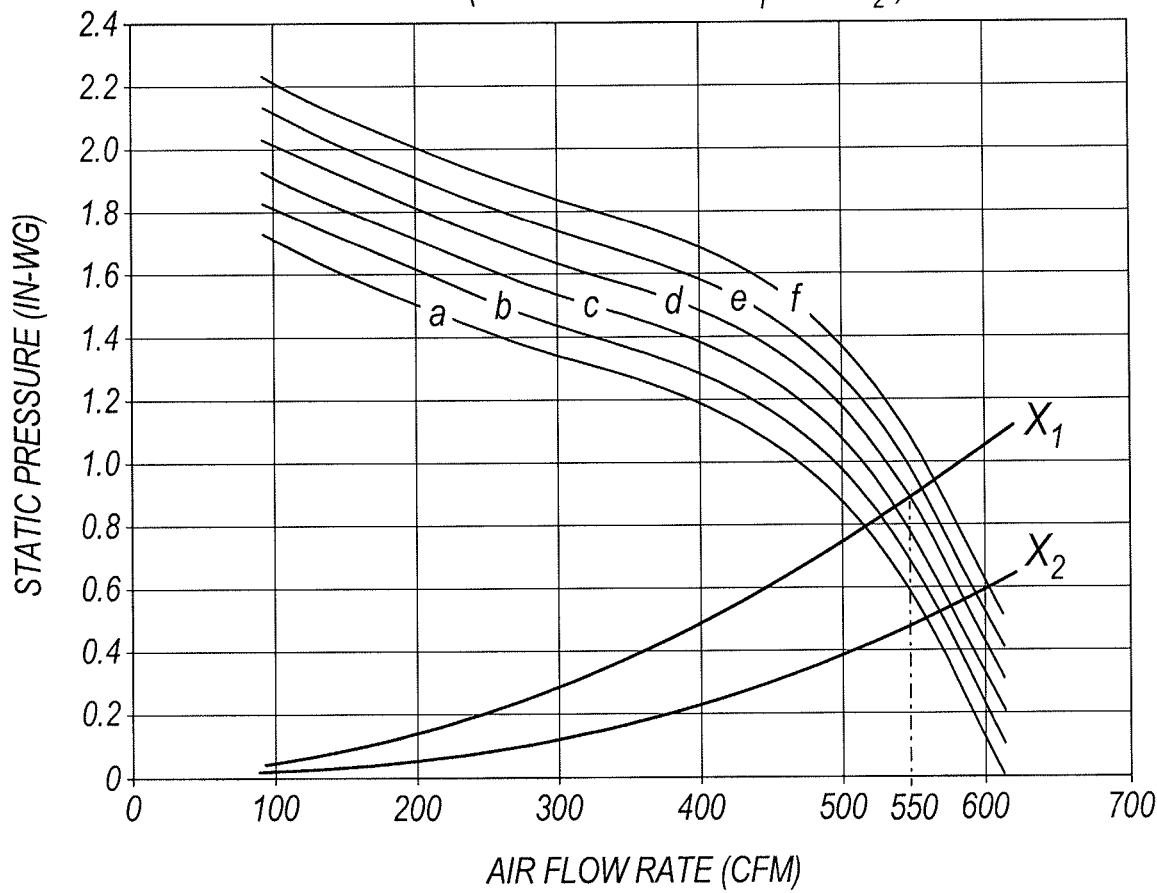
FIG. 5 is a graph illustrating calibration curves for a ventilation unit according to some embodiments of the present invention.

FIG. 5 illustrates calibration curves for a ventilation unit 22 according to some embodiments of the present invention. System curves "X1" and "X2" represent the characteristics of particular ventilation systems. It should be understood by one of ordinary skill in the art that system "X1" is more restrictive than system "X2." Curves "a-f" represent the performance of a 550 cfm-rated ventilation unit for increasing values of power supply "a-f" As indicated by the intersection between the system "X2" curve and each of the performance curves, the 550 cfm-rated ventilation unit will generate at least 550 cfm of air flow for any power supply value "a-f" In contrast, the intersection between the system "X1" curve and each of the performance curves indicates that in order for the ventilation unit to generate at least 550 cfm of air flow, the power supplied to the motor 36 must be a value of "d" or greater. Consequently, a ventilation unit 22 having an operating curve determined by data acquisition 54 and data processing 56 to be equivalent to system "X1," can automatically execute a system correction 58 adjusting the power supplied to the motor 36 to a value "d." The operating curve and calibration curves can provide information enabling further calibration of the ventilation unit 22. For example, further calibration can ensure that a ventilation unit 22 having multiple air flow settings can perform at each rated level.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention.

What is claimed is:

1. A ventilation unit for installation in a ventilation system, the unit comprising:
   a motor coupled to a fan element and a power source; and
   a calibration module for adjusting an actual air flow rate of the ventilation unit altered by at least one physical characteristic of the ventilation system, the calibration module including at least one system curve corresponding to the at least one physical characteristic of the ventilation system, the calibration module also including a plurality of operating curves that each correspond to a different power supply value corresponding to a performance rating of the unit;
   wherein the calibration module is configured to compare the system curve to the plurality of operating curves to determine the power supply value for a desired reference flow rate, the calibration module including a power regulator coupled to the motor and configured and arranged to provide power to the motor at the determined power supply value to alter the actual flow rate through the ventilation system such that the actual flow rate corresponds to the reference flow rate for the performance rating of the unit;
   wherein the at least one physical characteristic of the ventilation system comprises at least one of cross-sectional area and length of a flow path: straight, angled, and jointed portions: filters; termination fittings; and combinations thereof.

2. The ventilation unit of claim 1, wherein the calibration module includes a user interface.

3. The ventilation unit of claim 1, wherein the calibration module further includes a controller coupled to the power regulator.

4. The ventilation unit of claim 3, wherein the controller is programmed to store a look-up table.

5. The ventilation unit of claim 3, wherein the controller is programmed to compute at least one algorithm.

6. The ventilation unit of claim 1, wherein the calibration module includes a sensor.

7. The ventilation unit of claim 6, wherein the sensor is one of a voltage sensor, a current sensor, and a hall-effect sensor.

8. The ventilation unit of claim 6, wherein the sensor is one of a static pressure sensor, a fluid flow rate sensor, and a rotational motion sensor.

9. The ventilation unit of claim 1, wherein the motor is a BLAC, PMAC, or BLDC motor.

10. The ventilation unit of claim 1, wherein the calibration module is configured to monitor performance of the ventilation system and compare at least one second system curve to the plurality of operating curves if the performance of the ventilation system exceeds a predetermined threshold.

11. A method of installing a performance rated ventilation unit, the method comprising:
connecting a ventilation unit including a motor and a fan to a ventilation system;
assessing at least one physical characteristic of a ventilation system to determine at least one system curve corresponding to the at least one physical characteristic;
assessing at least one of a current and voltage supply capacity of a power source;
comparing the at least one system curve to a plurality of operating curves that each corresponds to a different power supply value corresponding to a performance rating of the unit to determine the power supply value for a desired reference flow rate, and adjusting power supplied to the motor according to the determined power value to alter the actual flow rate of the ventilation system such that the actual flow rate corresponds to the reference flow rate for the performance rating of the unit and the at least one physical characteristic of the ventilation;
wherein the at least one physical characteristic of the ventilation system comprises at least one of cross-sectional area and length of a flow path; straight, angled, and jointed portions; filters; termination fittings; and combinations thereof.

12. The installation method of claim 11, and further comprising initiating at least one step of the method via a user interface.

13. The installation method of claim 11, and further comprising reassessing at least one characteristic of a ventilation system after adjusting the power supplied to the ventilation unit.

14. The installation method of claim 11, wherein at least one of the assessing steps is performed by a calibration module of the ventilation unit.

15. The installation method of claim 11, wherein the adjusting step is performed by a controller and one of a current and voltage regulator.

16. The method of claim 11, further comprising:
monitoring performance of the ventilation system; and
comparing at least one second system curve to the plurality of operating curves if the performance of the ventilation system exceeds a predetermined threshold.

* * * * *